(12) United States Patent
Figge et al.

(10) Patent No.: US 6,677,424 B2
(45) Date of Patent: Jan. 13, 2004

(54) COATING COMPOSITION

(75) Inventors: Hans-Jünrgen Figge, Münster (DE); Georg Wigger, Senden (DE); Marita Schilling, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/040,820

(22) Filed: Jan. 7, 2002

(65) Prior Publication Data

US 2002/0055603 A1 May 9, 2002

Related U.S. Application Data

(62) Division of application No. 09/310,593, filed on May 12, 1999, now Pat. No. 6,355,761.

(30) Foreign Application Priority Data

May 20, 1998 (DE) .......................................... 198 22 631

(51) Int. Cl.⁷ ........................ C08G 18/80; C08G 18/10; C08G 18/79; C08G 18/42; C08L 75/06
(52) U.S. Cl. ............................ 528/45; 528/59; 528/60; 528/67; 528/71; 528/73; 528/74.5; 528/80; 528/83
(58) Field of Search .............................. 528/45, 73, 67, 528/59, 60, 71, 80, 83, 74.5

(56) References Cited

U.S. PATENT DOCUMENTS

| 3,666,835 A | * | 5/1972 | Schloss ........................ 528/66 |
| 4,403,085 A | * | 9/1983 | Christenson et al. ......... 528/45 |
| 4,413,111 A | * | 11/1983 | Markusch et al. ............ 528/59 |
| 4,623,731 A | * | 11/1986 | Ivanov et al. ............ 548/365.1 |

FOREIGN PATENT DOCUMENTS

| EP | 159117 | * | 10/1985 |
| EP | 682051 | * | 11/1995 |
| EP | 688803 | * | 12/1995 |
| WO | 95/06674 | * | 3/1995 |

\* cited by examiner

*Primary Examiner*—Rabon Sergent

(57) ABSTRACT

The invention relates to a coating composition comprising at least one OH-functional binder component and at least one component compound, functioning as a crosslinking agent, which has NCO groups blocked with a pyrazole compound. It is characterized in that the component compound which functions as a crosslinking agent is obtainable by a) polymerizing a polyol or a mixture of polyols having a number-average molecular weight in the range from 300–5000 by adding a polyisocyanate compound A or a mixture of polyisocyanate compounds A to give a polyurethane prepolymer, b) chain-extending the polyurethane prepolymer by adding a chain extender compound, to give a polyurethane polymer having free OH groups, c) reacting the OH-containing polyurethane polymer from b) with a polyisocyanate B or a mixture of polyisocyanates B to give a polyisocyanate-polyurethane polymer, and d) free isocyanate groups of the polyisocyanate-polyurethane polymer having been blocked with the pyrazole compound or a mixture of pyrazole compounds.

13 Claims, No Drawings

COATING COMPOSITION

This application is a divisional of U.S. Ser. No. 09/310,593 filed May 12, 1999, now U.S. Pat. No. 6,355,761.

The invention relates to a coating composition comprising at least one OH-functional binder component and at least one component compound, functioning as a crosslinking agent, which has NCO groups blocked with a pyrazole compound.

Coating compositions are used to coat a substrate with one (or more) coat(s) which may have a substrate-protective function, especially an anticorrosion function, a surfacer function, leveling out instances of surface unevenness, and/or a decorative function. Such coating compositions are referred to as primer, surfacer and topcoat. Where the decorative topcoat is not to be actually the topmost coat, owing to subsequent overcoating with an additionally protecting clearcoat finish, it is also referred to as a basecoat. The term component or component compound is intended to express that the respective components may be present as different substances in the coating composition or that the components may be parts of a single substance. If an OH-functional binder component is one substance which at the same time contains the component compound functioning as crosslinking agent, then said substance is self-crosslinking. If, on the other hand, it comprises different substances, then there is a customary substance pairing comprising binder and crosslinker. In a crosslinking reaction, free NCO groups react with free OH groups. Blocked isocyanate groups are isocyanate groups which have been provided with a protective group and which at room temperature are unreactive, or virtually unreactive, toward free OH groups. A coating composition of the structure specified at the outset can therefore be stored for long periods without any premature crosslinking, which would disrupt the processing. After processing, the protective groups are removed just by the action of heat, in the form known as stoving, and the NCO groups are reactivated so that the crosslinking reaction, which is now desired, and, consequently, the curing of the coating produced can take place. The use of pyrazole compounds as protective groups has the advantage, in particular, that the activation of the NCO groups and, consequently, stoving or curing can take place at relatively low temperatures (low-bake method).

Coating compositions of the composition specified at the outset are known from the literature references EP 0 159 117, EP 0 682 051 and WO 95/06674. In these known coating compositions an OH functional binder component is crosslinked with a separate polyisocyanate compound which functions as a crosslinking agent, said separate polyisocyanate compound being of customary and simple construction and the NCO groups being blocked with a pyrazole compound. In the case of EP 0 682 051 and WO 95/06674 a conventional blocking compound is employed in addition to the pyrazole compound. The polyisocyanate compounds described cannot be given a self-crosslinking configuration.

The literature reference EP 0 688 803 discloses a flexibilized plastic, especially for the construction sector, in which an amine-functional substance is cured with an isocyanate prepolymer having blocked NCO groups which is built up on the basis of aromatic diisocyanates and polyether alcohols. The NCO groups are blocked with various blocking compounds, including a pyrazole compound.

These known coating compositions are capable of improvement in various respects. On the one hand, it is desirable to reduce the stoving temperature. On the other hand, however, the customary properties, especially the good sandability and good topcoat holdout in conjunction with conventional and water-thinnable (decorative) basecoats in the case of a surfacer, must be at least maintained.

Against this background, the technical problem of the invention is to create a coating composition of improved stoving behavior which produces coatings that satisfy all of the technical coatings requirements.

To solve this technical problem the invention teaches that the component compound which functions as crosslinking agent is obtainable by a) polymerizing a polyol or a mixture of polyols having a number-average molecular weight in the range from 300–5000 by adding a polyisocyanate compound A or a mixture of polyisocyanate compounds A to give a polyurethane prepolymer, b) chain-extending the polyurethane prepolymer by adding a chain extender compound, to give a polyurethane polymer having free OH groups, c) reacting the OH-containing polyurethane polymer from b) with a polyisocyanate B or a mixture of polyisocyanates B to give a polyisocyanate-polyurethane polymer, and d) free isocyanate groups of the polyisocyanate-polyurethane polymer having been blocked with the pyrazole compound or a mixture of pyrazole compounds.

The core of the invention, accordingly, is that first an OH-containing polyurethane polymer of specific composition is prepared from a polyurethane prepolymer and that second a polyisocyanate-polyurethane polymer is formed from said prepolymer with a polyisocyanate B, with a certain proportion, up to 100%, of the NCO groups of the polyurethane prepolymer having already been subjected to controlled blocking with a pyrazole compound. Surprisingly, a coating composition of the invention is not only curable at low temperature but also exhibits improved properties, especially a very good sandability.

In one preferred embodiment of the invention the component compound which functions as a crosslinking agent is obtainable by blocking some of the free isocyanate groups of the polyurethane prepolymer and/or some of the free isocyanate groups of the polyisocyanate B before chain extension with the pyrazole compound or mixture of pyrazole compounds.

A coating composition of the invention can be configured individually in various ways. If the component compound which functions as a crosslinking agent is to be externally crosslinking, then it is advisable for all free OH groups of the chain-extended polyurethane polymer to be reacted with the polyisocyanate B or mixture of polyisocyanates B and for the OH-functional binder component to be a substance which is different from the component compound which functions as a crosslinking agent. If, on the other hand, the component compound which functions as a crosslinking agent is to be self-crosslinking, in which case it may be possible to omit a separate OH-functional binder component (but not necessarily so), then it is advisable for only some of the free OH groups of the chain-extended polyurethane polymer to be reacted with the polyisocyanate B or mixture of polyisocyanates B and for at least one OH-functional binder component to be identical with the component compound which functions as a crosslinking agent.

In one preferred embodiment, the procedure is such that the chain extender compound has a secondary amine group and at least two OH groups. In this case, one secondary amine group reacts first of all with a polyurethane prepolymer molecule. Then one of the two OH groups reacts with another polyurethane prepolymer molecule. Depending on the proportions in which the polyisocyanate B is employed, the result is an OH-containing compound which functions as a crosslinking agent or a compound which is virtually free from OH groups.

To aid understanding of the invention, idealized molecules of the two above-described variants of the component compound which functions as a crosslinking agent are shown below. Molecule (1) is a compound which is virtually free from OH groups. This is employed, in otherwise conventional manner, together with a separate OH-functional binder component. Molecule (2) is an OH-containing compound, which is consequently self-crosslinking.

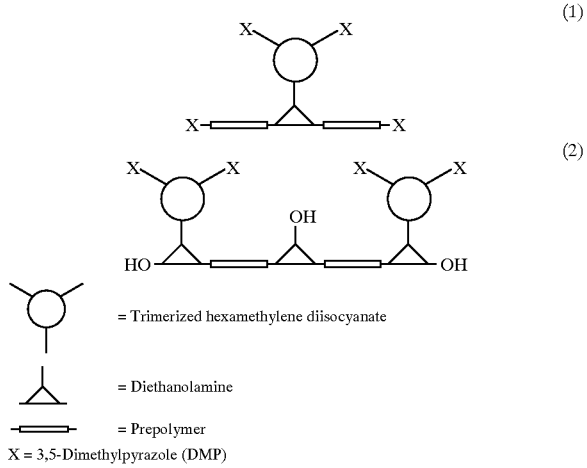

Polyols suitable for preparing the polyurethane prepolymer are, in principle, all conventional polyols, examples being polyester polyols and/or polyether polyols customary in the field of paint chemistry. Such polyols are known to the skilled worker and need not be elucidated further here. It is preferred to use a polyester diol which is obtainable from isophthalic acid, dimeric fatty acid and hexanediol and has a number-average molecular weight of 1000–2000, preferably 1200–1600. Also suitable for preparing the polyurethane prepolymer are all common polyisocyanates A, especially diisocyanates. Preferred diisocyanates are those whose isocyanate groups are attached to aliphatic or cycloaliphatic radicals. Examples of these are hexamethylene diisocyanate, isophorone diisocyanate, trimethylhexamethylene diisocyanate and, in particular, dicyclohexylmethane diisocyanate.

The pyrazole compound preferably has the general formula

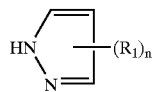

where n is a natural number, $R_1$ where n>1 can be identical or different and $R_1$ is alkyl, alkenyl, aralkyl, N-substituted carbamoyl, phenyl, $NO_2$, halogen or $-COOR_2$ where $R_2$ is $C_1-C_4$ alkyl. With particular preference, the pyrazole compound is selected from the group consisting of 3,5-dimethylpyrazole, 3-methylpyrazole, 4-nitro-3,5-dimethylpyrazole and 4-bromo-3,5-dimethylpyrazole or is a mixture of elements from this group.

Depending on the embodiment of the invention—OH-containing or OH-free component compound which functions as a crosslinking agent—the molar ratio of the free OH groups of the chain-extended polyurethane polymer to unblocked isocyanate groups of the polyisocyanate B is in the range from 5:1 to 5:3 (1st alternative) or from 1:3 to 1:1 (2nd alternative).

Insofar as substances different from the component compound which functions as a crosslinking agent are employed as OH-functional binder component, they can be the substances customary in coatings technology, which are well known to the skilled worker. Merely by way of example, the following are mentioned: hydroxy-functional polyacrylates, hydroxy-functional polyesters and polyethers, and hydroxy-functional polyurethanes.

A coating composition of the invention can be formulated either as a conventional system with organic solvents or as a water-thinnable system. In the latter case it is advisable to introduce, by conventional means, ionic groups into the component compounds in order to permit dispersibility in water. Neutralization and/or pH adjustment can be carried out in conventional manner, for example, with customary amines. A coating composition of the invention may additionally be formulated as a primer, surfacer, (decorative) basecoat or clearcoat. In the case of the first three formulations, extenders and/or pigments are added. Customary auxiliaries and additives such as leveling agents, antioxidants, UV absorbers and free-radical scavengers may be added to all formulations. Formulation as surfacers is particularly preferred. A coating composition of the invention typically has a solids content in the range from 20 to 60%, preferably from 30 to 40%. The viscosity should be within the range from 2.0 to 10.0 dPas, preferably from 3.0 to 8.0 dPas (cone and plate viscosity measured 1:1 in N-methylpyrrolidone at 23° C. and 1000 $s^{-1}$). The viscosity is adjusted conventionally by adding an appropriate amount of customary organic solvents or water.

The invention also embraces a process for preparing the coating compositions. Depending on the embodiment of the invention—OH-containing or OH-free component compound which functions as a crosslinking agent—this process involves operating either such that the component compound which functions as a crosslinking agent is dispersed or dissolved in water or in an organic solvent and customary coatings additives, possibly including pigments, are added and the mixture is homogenized or such that the component compound which functions as a crosslinking agent is dispersed or dissolved in water or in an organic solvent, at least one OH-functional binder component, preferably dispersed or dissolved in water or in an organic solvent, is mixed with the component compound which functions as a crosslinking agent, customary coatings additives, possibly including pigments, are added, and the mixture is homogenized. In the former case, however, it is also possible in addition to add a separate OH-functional binder component.

The invention additionally provides for the use of a coating composition as claimed in any one of Claims 1 to 8 for producing a coating on a substrate, preferably on a motor vehicle body or motor vehicle body part, and for the use of a coating composition as claimed in any one of claims 1 to 8 for producing a filler coating stovable at below 130° C. on a substrate, preferably on automotive bodywork or an automotive bodywork part.

The invention is elucidated further below with reference to working examples.

EXAMPLE 1

631.2 g of a polyester diol formed from isophthalic acid, dimeric fatty acid and hexanediol ($M_n$ about 1400) and 60.4 g of dimethylolpropionic acid are prepolymerized with 354.4 g of 4,4'-dicyclohexylmethane diisocyanate. (Desmodur W from Bayer) in 448.2 g of ethyl methyl ketone at 80° C. until the NCO value is constant. Subsequently, 36.5 g of 3,5-dimethylpyrazole (DMP) are added and the reaction mixture is held at 80° C. with stirring for 2 hours. After the temperature has been reduced to 60° C., 108.9 g of trimerized hexamethylene diisocyanate (Basonat HI 100 from BASF) and 54.4 g of ethyl methyl ketone are added and the mixture is stirred at 60° C. for 30 minutes, after which a further 36.5 g of DMP are added. The reaction mixture is maintained at 60° C. for a further hour and then chain extension is carried out by adding 20.0 g of diethanolamine and 20 g of ethyl methyl ketone. After awaiting the exothermic reaction, the reaction mixture is run to a percent NCO value of less than 0.1. At this point the product has a cone and plate viscosity of from 3.0 to 6.0 dPas, measured 1:1 in N-methylpyrrolidone at 23° C. and 1000 s$^{-1}$. After 70% neutralization with dimethylethanolamine at 70–80° C., 1972 g of distilled water are added slowly to the mixture with vigorous stirring and the mixture is dispersed. Thereafter, the ethyl methyl ketone is distilled off in vacuo and 121 g of butyldiglycol (9.7% based on solids) are added. The dispersion is subsequently adjusted to a solids content of 37% using distilled water.

EXAMPLE 2

532.2 g of a polyester diol formed from isophthalic acid, dimeric fatty acid and hexanediol ($M_n$ about 1400) and 68.8 g of dimethylolpropionic acid are prepolymerized with 397.3 g of 4,4'-dicyclohexylmethane diisocyanate (Desmodur W from Bayer) in 429.8 g of ethyl methyl ketone at 80° C. until the NCO value is constant. After the reaction temperature has been reduced to 60° C., 258.7 g of trimerized hexamethylene-diisocyanate (Basonat HI 100 from BASF) and 367 g of ethyl methyl ketone are added and the mixture is stirred at 60° C. for 30 minutes. Subsequently, 80.9 g of 3,5-dimethylpyrazole (DMP) are added and the reaction mixture is held at 60° C. with stirring for 1 hour. Then chain extension is carried out by adding 86.3 g of diethanolamine and 225.5 g of ethyl methyl ketone. After awaiting the exothermic reaction, the reaction mixture is run to a percent NCO value of less than 0.3. At this point the product has a cone and plate viscosity of from 4.0 to 8.0 dPas, measured 1:1 in N-methylpyrrolidone at 23° C. and 1000 s$^{-1}$. After 70% neutralization with dimethylethanolamine at about 70° C., 138.1 g of butyldiglycol (9.7% based on solid resin content) are added, and dispersion is carried out with 2450 g of distilled water, with vigorous stirring. Thereafter, the ethyl methyl ketone is distilled off in vacuo. The dispersion is subsequently adjusted to a solids content of 35% using distilled water.

EXAMPLE 3
(Comparative Example to Example 1)

631.2 g of a polyester diol formed from isophthalic acid, dimeric fatty acid and hexanediol ($M_n$ about 1400) and 60.4 g of dimethylolpropionic acid are prepolymerized with 354.4 g of 4,4'-dicyclohexylmethane diisocyanate (Desmodur W from Bayer) in 448.2 g of ethyl methyl ketone at 80° C. until the NCO value is constant. Subsequently, 33.1 g of ethyl methyl ketoxime (MEK oxime) are added and the reaction mixture is held at 80° C. with stirring for 2 hours. After the temperature has been reduced to 60° C., 108.9 g of trimerized hexamethylene diisocyanate (Basonat HI 100 from BASF) and 54.4 g of ethyl methyl ketone are added and the mixture is stirred at 60° C. for 30 minutes, after which a further 33.1 g of MEK oxime are added. The reaction mixture is maintained at 60° C. for a further hour and then chain extension is carried out by adding 20.0 g of diethanolamine and 20 g of ethyl methyl ketone. After awaiting the exothermic reaction, the reaction mixture is run to a percent NCO value of less than 0.1. At this point the product has a cone and plate viscosity of from 3.0 to 6.0 dPas, measured 1:1 in N-methylpyrrolidone at 23° C. and 1000 s$^{-1}$. After 70% neutralization with dimethylethanolamine at 70–80° C., 1972 g of distilled water are added slowly to the mixture, with vigorous stirring and the mixture is dispersed. Thereafter, the ethyl methyl ketone is distilled off in vacuo and 120.4 g of butyldiglycol (9.7% based on solids) are added. The dispersion is subsequently adjusted to a solids content of 37% using distilled water.

EXAMPLE 4
(Comparative Example to Example 2)

519.4 g of a polyester diol formed from isophthalic acid, dimeric fatty acid and hexanediol ($M_n$ about 1400) and 67.1 g of dimethylolpropionic acid are prepolymerized with 387.7 g of 4,4'-dicyclohexylmethane diisocyanate (Desmodur W from Bayer) in 419.5 g of ethyl methyl ketone at 80° C. until the NCO value is constant. After the reaction temperature has been reduced to 60° C., 262.1 g of trimerized hexamethylene-diisocyanate (Basonat HI 100 from BASF) and 372.4 g of ethyl methyl ketone are added and the mixture is stirred at 60° C. for 30 minutes. Subsequently, 74.5 g of ethyl methyl ketoxime (MEK oxime) are added and the reaction mixture is held at 60° C. with stirring for 1 hour. Then chain extension is carried out by adding 87.4 g of diethanolamine and 222.9 g of ethyl methyl ketone. After awaiting the exothermic reaction, the reaction mixture is run to a percent NCO value of less than 0.3. At this point the product has a cone and plate viscosity of from 3.0 to 6.0 dPas, measured 1:1 in N-methylpyrrolidone at 23° C. and 1000 s$^{-1}$. After 70% neutralization with dimethylethanolamine at about 70° C., 2545 g of distilled water are added slowly to the mixture with vigorous stirring and the mixture is dispersed. Thereafter, the ethyl methyl ketone is distilled off in vacuo and 135.6 g butyldiglycol (9.7% based on solids) are added. The dispersion is subsequently adjusted to a solids content of 35% using distilled water.

EXAMPLE 5

Surfacers were prepared with the crosslinking agents of Examples 1 to 4 by adding a customary OH-functional binder component and extenders. These surfacers were sprayed onto a metal panel common in the automotive sector. Then stoving was carried out for 15 minutes at a temperature of 120° C. In the case of the coatings obtained on the basis of the crosslinking agents from Examples 1 and 2, the result was excellent sandability and a very good topcoat holdout of subsequently applied basecoat films. In the case of the coatings obtained on the basis of the crosslinking agents from Examples 3 and 4, the result was a markedly poorer sandability compared with the previous examples, which can probably be attributed to the relatively low stoving temperature.

What is claimed is:

1. A coating composition comprising
   at least one OH-functional binder component and
   at least one component compound that functions as a crosslinking agent and that has isocyanate groups blocked with a pyrazole compound,
   wherein the component compound which functions as a crosslinking agent is prepared by
   a) polyrnerizing a polyol or a mixture of polyols having number-average molecular weight in the range of 300–5000 and a polyisocyanate compound A or a mixture of polyisocyanate compounds A to give an isocyanate functional polyurethane prepolymer, a1) partially blocking the isocyanate functional polyurethane prepolymer with a pyrazole compound or a mixture of pyrazole compounds,
b) providing a polyisocyanate compound B consisting of trimerized hexamethylene diisocyanate,
b1) partially blocking the polyisocyanate B with a pyrazole compound, or a mixture of pyrazole compounds, and
c) chain extending by reacting a mixture of the partially blocked isocyanate compounds formed in steps a1 and b1 with a chain extender compound.

2. A coating composition according to claim 1, wherein the component compound which functions as a crosslinking agent comprises hydroxyl functional groups and blocked isocyanate ftinctional groups.

3. A coating composition according to claim 1, wherein the component compound which functions as a crosslinking agent comprises blocked isocyanate groups, and has no hydroxyl groups.

4. A coating composition according to claim 1, wherein the chain extender compound comprises a secondary amine group and at least two hydroxyl groups.

5. A coating composition according to claim 1, wherein the pyrazole compound has the general formula:

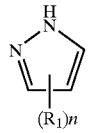

where n is a integer greater than or equal to 1, and the groups $R_1$ are independently selected from the group consisting of alkyl, alkenyl, aralkyl, N-substituted carbamoyl, phenyl, nitro, halogen, —$COOR_2$ where $R_2$ is $C_2$–$C_4$ alkyl, and mixtures thereof.

6. A coating composition according to claim 5, wherein the pyrazole compound is selected from the group consisting of 3,5-dimethylpyrazole, 3-methylpyrazole, 4-nitro-3,5-dimethylpyrazole, 4-bromo-3,5-dimethylpyrazole, and mixtures thereof.

7. A method for making a coating composition, comprising the steps of I) preparing a crosslinking compound that has isocyanate groups blocked with a pyrazole compound by
a) polymerizing a polyol or a mixture of polyols having a number-average molecular weight in the range of 300–5000 and a polyisocyanate compound A or a mixture of polyisocyanate compounds A to give an isocyanate functional polyurethane prepolymer;
a1) partially blocking the isocyanate functional polyurethane prepolymer with a pyrazole compound or a mixture of pyrazole compounds;
b) providing a polyisocyanate compound B consisting of trimerized hexamethylene diisocyanate;
b1) partially blocking the polyisocyanate B with a pyrazole compound, or a mixture of pyrazole compounds; and
c) chain extending by reacting a mixture of the partially blocked isocyanate compounds formed in steps a1 and b1 with a chain extender compound, and II) adding an OH-functional binder component.

8. A method according to claim 7, wherein at least part of the blocking reactions of a1 and b1 are carried out together.

9. A method according to claim 7, wherein the blocking steps a1 and b1 are carried out in sequence.

10. A method according to claim 7, wherein the chain extender compound comprises a secondary amine group and at least two hydroxyl groups.

11. A method according to claim 7, wherein the polyol comprises a polyester diol having a number average molecular weight of 1000 to 2000 prepared by polymerization of isophthalic acid, dimeric fatty acid, and hexanediol.

12. A method according to claim 7, wherein the pyrazole compound has the general formula:

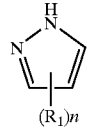

wherein is a integer greater than or equal to 1, and the groups $R_1$ are independently selected from the group consisting of alkyl, alkenyl, aralkyl, N-substituted carbamoyl, phenyl, nitro, halogen, —$COOR_2$ where $R_2$ is $C_2$–$C_4$ alkyl, and mixtures thereof.

13. A method according to claim 12, wherein the pyrazole compound is selected from the group consisting of 3,5-dimethylpyrazole, 3-methylpyrazole, 4-nitro-3,5-dimethylpyrazole, 4-bromo-3,5-dimethylpyrazole, and mixtures thereof.

* * * * *